United States Patent [19]

Viertl et al.

[11] 4,249,423
[45] Feb. 10, 1981

[54] SEMI-NONDESTRUCTIVE RESIDUAL STRESS MEASUREMENT

[75] Inventors: John R. M. Viertl, Schenectady; Marshall G. Jones, Scotia, both of N.Y.

[73] Assignee: General Electric Company, Schenectady, N.Y.

[21] Appl. No.: 38,069

[22] Filed: May 11, 1979

[51] Int. Cl.³ .......................................... G01N 19/06
[52] U.S. Cl. ..................................................... 73/783
[58] Field of Search ................. 73/760, 783, 787, 15.6

[56] References Cited

U.S. PATENT DOCUMENTS 3,696,504  10/1972  Cupler ................................... 29/558
3,765,230  10/1973  Bohm et al. ........................... 73/767

OTHER PUBLICATIONS

Bush, A. J., et al., "Simplification of... Stress Measurement," ISA Transactions, vol. 12, No. 3, 1973, pp. 249–259.

Primary Examiner—Jerry W. Myracle
Attorney, Agent, or Firm—Donald R. Campbell; Marvin Snyder; James C. Davis

[57] ABSTRACT

Residual stress measurements are made using a strain gage and stress relief achieved by local melting of a region of the object being tested by a laser beam or other finely directed heat source. Surface strain is measured dynamically before the heat of the molten region diffuses under the gage and results in thermal stress. The method is semi-nondestructive because the molten region recasts with little loss of material, is rapid, and can be utilized on difficult geometries such as the interior surface of reactor pipe.

8 Claims, 5 Drawing Figures

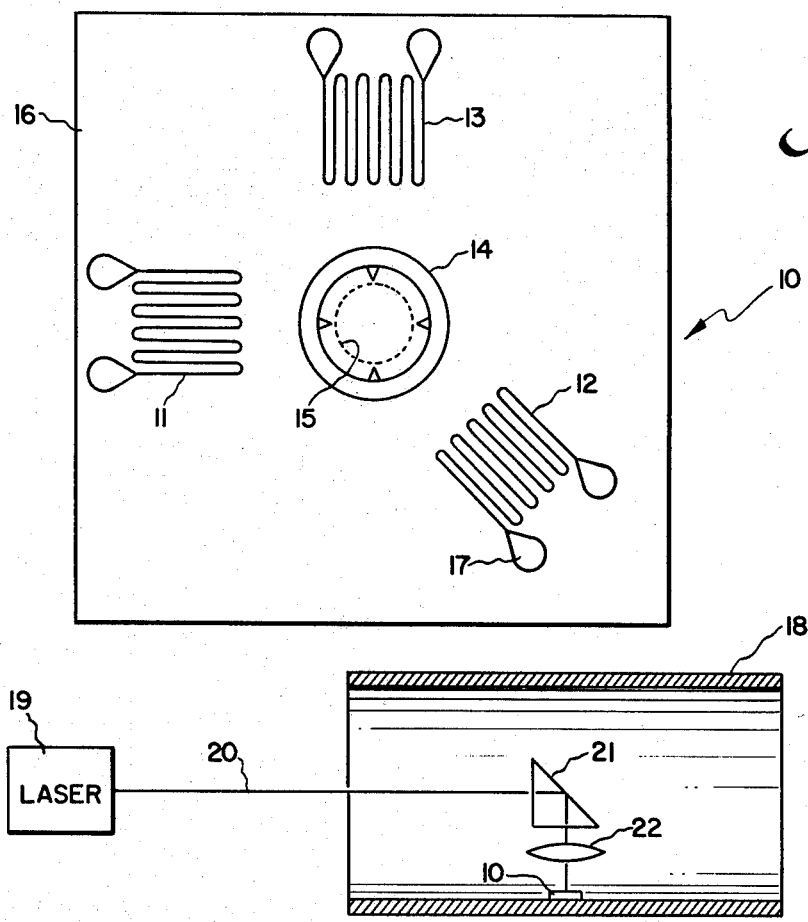
Fig. 1
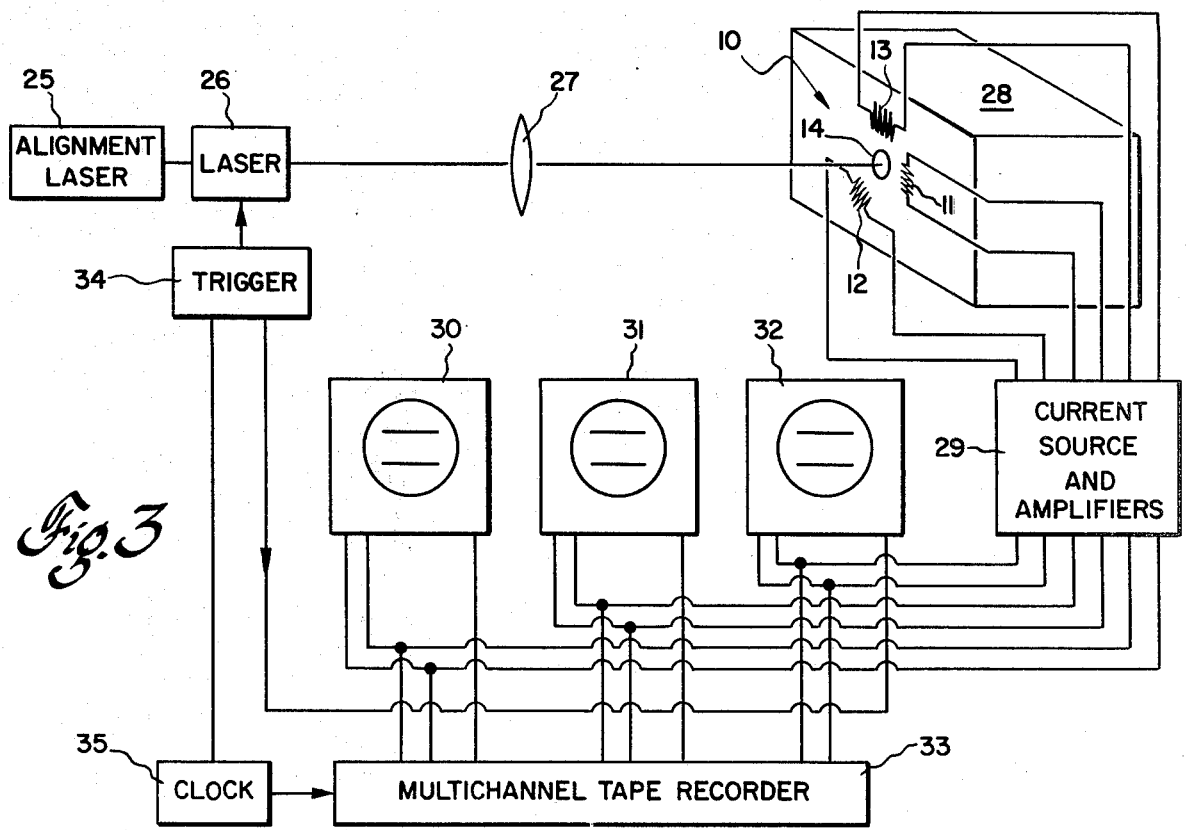
Fig. 2
Fig. 3

SEMI-NONDESTRUCTIVE RESIDUAL STRESS MEASUREMENT

BACKGROUND OF THE INVENTION

This invention relates to a method of residual stress measurement by a semi-nondestructive dynamic technique in which damage to the object is so small that the object tested is not impaired for further service.

In the past, residual stress or internal stress measurements have been made using destructive techniques. All the measurement methods required the stress relief of a specimen, and this invariably meant that the specimen was cut up by hole drilling, electrical discharge machining (EDM), sand blasting, or trepanning. Hole drilling is the most common but has the undesirable feature that the drill works the surface locally and builds in its own stresses. The EDM method while good is awkward to implement in the field. Efforts to determine residual stress nondestructively have met with little success except for the use of x-rays, which are sensitive to surface distrubances. Moreover, x-rays penetrate only a few atom layers and this technique is not a bulk method.

SUMMARY OF THE INVENTION

Residual stress measurements are made using strain gages and stress relief produced by locally and transiently melting a region of the object being tested in the vicinity of the strain gage. Local melting is realized by a laser or electron beam or other finely directed heat source, and a short heat pulse is used to limit the molten region and protect the strain gages. The strain relief process proceeds at the velocity of sound whereas diffusion of heat from the molten region takes place more slowly. The change in strain caused by stress relaxation is measured dynamically before the heat diffuses under the stress gages and results in themal stresses that would alter the measurements. The stress relieved state is thus achieved and measured dynamically. The method is termed semi-nondestructive because the molten region resolidifies in a few milliseconds before any significant amount of material is lost.

The preferred method employs a three-element rosette resistance strain gage and a hole is temporarily melted at the center of the rosette with the focused beam of a laser operated in pulse mode; the pulse length is 1–10 milliseconds. The resistance change and thus the change of strain is measured before the molten material recasts and before heat diffuses under the gages. Calibrations are taken care of by melting to realize stress relief. Residual stress is proportional to the surface strain mesurements that are the product of the method and is readily calculated. A modification of the technique is that the melted region surrounds the gage in an almost complete ring.

This method measures bulk residual stress, is rapid, is suitable for field measurements, and is adapted to difficult geometries such as measuring residual stress on the inside diameter of reactor pipes which are susceptible to stress corrosion. The laser beam can be deflected by optical components to impinge on an interior surface of the object.

BRIEF DESCRIPTION OF THE DRAWINGS

FIG. 1 is a plan view of a three-element rosette strain gage for hole melting;

FIG. 2 is a cross section through a reactor pipe showing a laser and optics for realizing local melting for residual stress measurement on the interior surface of the pipe;

FIG. 3 is a schematic block diagram of the laser-strain measurement system;

DESCRIPTION OF THE PREFERRED EMBODIMENTS

Figure 4:
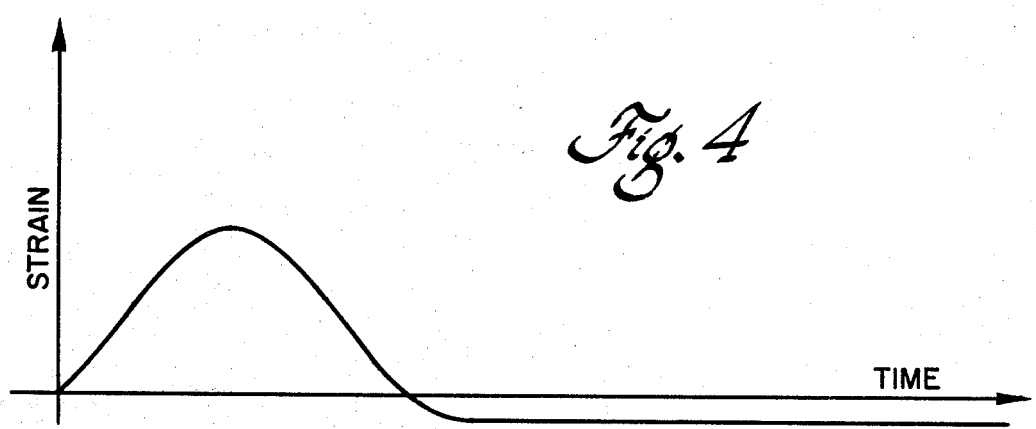
FIG. 4 is a plot of strain vs. time for a single gage element.

All residual stress measurements require the determination of a reference stress state, and methods utilizing strain gages achieve the reference state by stress relieving the specimen or object. Residual stress is also known as internal stress and is defined as a stress system within a solid that is not dependent on external forces. In the present method of measurement, the reference state is also determined by stress relieving the part being tested, but the stress is relieved by transient melting in the immediate vicinity of the gage. Transient or temporary melting is used so that the strain measurement can be completed before heat from the melted region can diffuse to the strain gages and affect their readings.

The three-element rosette strain gage 10 shown in FIG. 1 is typically selected when the principal stresses and their directions are to be determined. The three gage elements 11, 12, and 13 are arranged on a gage circle and are oriented at 0°, 45°, and 90°. At the center of the gage, concentric with the gage circle, is an annular ring 14 which serves as an alignment pattern and within which a hole 15 is transiently melted by an appropriate finely directed heat source. The accordian-pleated gage elements and the alignment pattern are etched foil components on a continuous plastic support 16 and are fabricated by printed circuit techniques. At either end of the gage element is an enlarged contact pad 17 for making electrical connections. Rosette gage 10 is a metallic resistance gage operative such that when a length of foil is mechanically stretched, a longer length of smaller conductor results and the electrical resistance is normally increased. If the length of resistance element is intimately attached to a strained part in such a way that it will also be strained, then the measured change in resistance can be calibrated in terms of the strain. Many other strain gage configurations are known and may be substituted for the rosette gage, depending upon the application.

The locally melted region or hole 15 for stress relief is produced at the center of the gage by a focused laser or electron beam, or indeed by any heat source capable of delivering a finely directed short heat pulse. Of these, the laser is preferred and is operated in pulse mode with a pulse length of about 1–10 milliseconds. The short heat pulse limits the molten region and protects the strain gages, and it is also important to melt the metal or ceramic object being tested without causing splattering. When the melting is properly controlled, the hole upon solidifying almost closes up. The semi-nondestructive nature of the method is realized because the molten region recasts in a few milliseconds before any significant amount of material is lost.

Local melting in the immediate vicinity of the strain gage relieves the stresses, and it is necessary to dynamically measure the change in strain caused by stress relaxation before the molten region solidifies and before the heat of the molten region diffuses under the strain gage and results in thermal stress that would alter the measurements. The strain relief process proceeds at the velocity of sound in the material; the thermal process of course proceeds at a much slower rate. Thus, the stress relieved state is achieved and measured dynamically. Calibrations are not needed and are taken care of by the melting, which gives a zero reference point.

The use of a remote, directed heat source permits residual stress measurements with difficult geometries such as an interior surface of an object. Referring to FIG. 2, one example is the measurement of residual stress on the ID (inside diameter) of a reactor pipe 18. Bulk welding residual stresses in nuclear piping play a major role in the intergranular stress corrosion cracking problem. Stress corrosion cracking occurs on the internal surface of the pipe and it is here that the measurement must be made. Power laser 19 is at a remote location and laser beam 20 after entering the pipe is deflected by a prism 21 through focusing lens 22 onto the center of the bonded rosette gage 10. A laser heat source and optical components for deflecting the beam, which may include mirrors, can be mounted on a movable carriage. The semi-nondestructive method is fast, less costly than existing methods, and lends itself to field measurements of residual stress.

In FIG. 3 is given the block diagram of a complete laser-strain measurement system. The laser subsystem includes an alignment laser 25, a power laser 26, and a focusing lens 27, and may be purchased components. The low power alignment laser is, for example, a helium-neon laser and is mounted on a common axis with the power laser, which is a neodymium-doped glass laser with a wavelength of 1.06 microns. The alignment laser has a different wavelength in the red region and assures that the power laser heat source pulse is at the center of the gage. Gage 10 is the same as in FIG. 1 and may be a commercially available hole-drilling rosette strain gage. Such gages are relatively small with an overall dimension of one-quarter inch or less and are bonded to object 28 with an appropriate adhesive. The change in strain after laer hole melting is measured by electrical circuitry including a current source and amplifiers 29. A constant current is fed to each gage element and the measured voltage across the element is directly proportional to strain, which in turn, is proportional to stress. Stress is determined by multiplying the strain by the modulus of elasticity, E, for the test material. FIG. 4 depicts a typical strain vs. time curve for an object or part with residual stress. The measurement that is wanted is the maximum value of strain; this is the zero reference state for the strain relieved material and occurs when the material is melted.

The remainder of the system in FIG. 3 includes three parallel channel operated oscilloscopes 30–32, one for each gage element, with camera recording, and a multichannel tape recorder 33 so that the data can be played back and examined at leisure. A trigger 34 feeds a start signal to laser 26 and to the oscilloscopes, and also starts a clock 35 for delayed operation of the tape recorder. Knowing the three strains for the rosette gage configuration, the calculation of stresses and the magnitude of the principal stresses and their directions is a routine matter. Refer to "Hole-Drilling Strain-Gage Method of Measuring Residual Stresses", N. G. Rendler and I. Vigness, *Experimental Mechanics*, December 1966, pages 577–586; and to the book "Mechanical Measurements", Second Edition, T. G. Beckwith and N. L. Buck, Addison-Wesley Publishing Company, 1973, Library of Congress Catalog Card No. 70-85380. Alternatively, a microprocessor is presented with the three voltages representing strain and performs the computation of the principal stresses and their direction.

Figure 5:
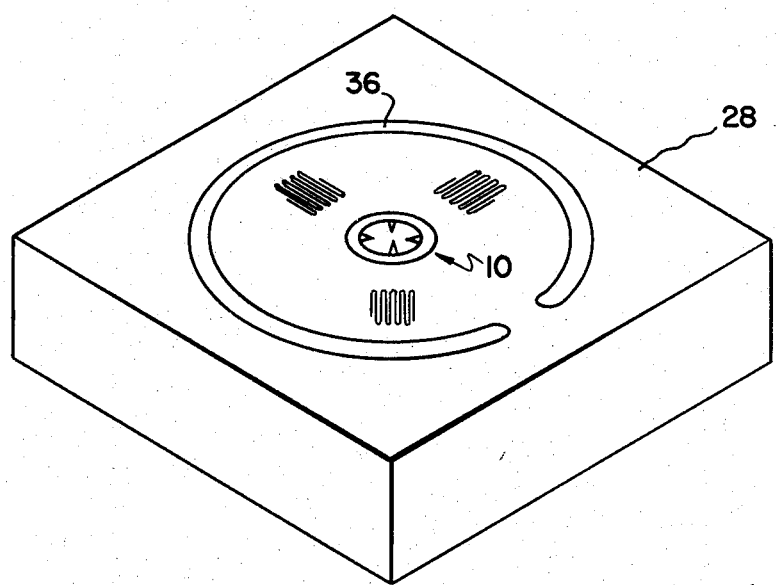
FIG. 5 depicts an almost complete ring-shaped melted region for stress relief.

Under some circumstances the hole melting method may have insufficient sensitivity or accuracy, and the trepanning method can be used when a more accurate and sensitive technique is needed. In this case, instead of making a hole in the center of the gage, a stress-relieved almost complete ring-shaped region 36, FIG. 5, is melted around the gage's perimeter. A finely focused laser beam is deflected to trace out the almost complete ring.

An alternative method is disclosed and claimed in application Ser. No. 037,872 filed on May 10, 1979, R. A. Thompson and H. P. Wang, "Measurement of Residual Stress by Local Melting", assigned to the same assignee as this invention. The strain measurement is made after the locally melted region has recast and after thermal stresses are dissipated, and the effect of both thermal stress and recast stress is eliminated by subtracting a calibration measurement of an annealed specimen of the same material from the measurement of the object with residual stress.

While the invention has been particularly shown and described with reference to several preferred embodiments thereof, it will be understood by those skilled in the art that various changes in form and details may be made therein without departing from the spirit and scope of the invention.

The invention claimed is:

1. A semi-nondestructive method of making surface strain measurements on an object for determination of residual stresses comprising the steps of:
    attaching a strain gage to the surface of the object being tested,
    locally melting a region of the object in the immediate vicinity of the strain gage with a finely directed heat source to thereby relieve the stresses, and
    dynamically measuring the change in strain caused by stress relaxation while the region is molten and before heat diffuses under the strain gage and results in thermal stress that would alter the measurements.

2. The method of claim 1 wherein said heat source is a focused laser beam.

3. The method of claim 2 wherein the laser beam has a pulse length of 1–10 milliseconds.

4. The method of claim 2 wherein the laser beam is deflected to direct the beam onto an interior surface of the object being tested.

5. The method of claim 4 wherein the heat source is a focused laser beam pulse having a pulse length of about 1–10 milliseconds.

6. A semi-nondestructive method of making surface strain measurements on an object for determination of residual stresses comprising the steps of:
    attaching a multielement rosette resistance strain gage to the surface of an object being tested,
    locally and transiently melting a hole in the object at the center of the rosette gage with the focused beam of a laser to thereby relieve the stresses, and
    dynamically measuring the resistance of each gage element and thus the change of strain while the material is molten and before heat diffuses under the gage and results in thermal stress that would alter the measurements.

7. The method of claim 6 wherein the laser is operated in pulse mode with a pulse length between 1–10 milliseconds.

8. The method of claim 7 wherein the laser beam is deflected through an angle at least once by optical components to direct the beam onto an interior surface of the object being heated.

* * * * *